United States Patent [19]

Inukai

[11] 4,193,566
[45] Mar. 18, 1980

[54] WEBBING RETRACTOR FOR SEATBELT SYSTEM

[75] Inventor: Mitsuo Inukai, Nagoya, Japan

[73] Assignee: Kabushiki Kaisha Tokai Rika Denki Seisakusho, Aichi, Japan

[21] Appl. No.: 974,008

[22] Filed: Dec. 28, 1978

[30] Foreign Application Priority Data

Dec. 29, 1977 [JP] Japan .............................. 52-176264[U]
Dec. 29, 1977 [JP] Japan .............................. 52-176265[U]

[51] Int. Cl.² ...................... A62B 35/02; B65H 75/48
[52] U.S. Cl. ............................................. 242/107.4 A
[58] Field of Search .................. 242/107.4 R, 107.4 E; 297/388; 280/801, 803, 806, 807, 808

[56] References Cited

U.S. PATENT DOCUMENTS

4,059,242 11/1977 Tanaka .......................... 242/107.7 X
4,090,678 5/1978 Yamanashi .................... 242/107.4 A Primary Examiner—John M. Jillions
Attorney, Agent, or Firm—Koda and Androlia

[57] ABSTRACT

A pair of pawls engageable with a ratchet wheel by the actuation of an acceleration detector are adapted to oscillate a lock bar through a working plate, so that said lock bar can prevent the rotation of a take-up shaft solidly secured to said ratchet wheel, to thereby stop the wind-out of a webbing for restraining an occupant which has been wound up by said take-up shaft. Particularly, since said pair of pawls are mounted on said acceleration detector through a balancer, either one of the pawls can reliably engage the ratchet wheel. Furthermore, since those pawls are guided by a guide member or members, the balancer and pawls are improved in stability.

10 Claims, 10 Drawing Figures

WEBBING RETRACTOR FOR SEATBELT SYSTEM

BACKGROUND OF THE INVENTION

1. Field of the Invention

The present invention relates to a seatbelt retractor for use in a seatbelt system for restraining an occupant to protect him in an emergency of a vehicle.

2. Description of the Prior Art

For the webbing retractors, such an arrangement has been commonly used that the remaining portion of the webbing for restraining the occupant is wound up to the take-up shaft biased by a force, made it possible to be freely wound out in the normal running condition of the vehicle, and, in an emergency, a lock bar is engaged with a ratchet wheel solidly secured to the take-up shaft, whereby the wind-out of the webbing is instantaneously stopped, thus reliably securing the occupant.

However, with such a webbing retractor, in an emergency of the vehicle, the tooth top of a lock bar oscillated in an emergency of the vehicle impinges on the tooth top of the ratchet wheel and the lock bar is sprung back, and it takes a long period of time for the lock bar to be reliably engaged with the ratchet wheel to stop wind-out rotation of the ratchet wheel and the takeup shaft, during which time the webbing is wound out to an appreciable extent, whereby the occupant becomes restrained incompletely, thus incurring such possibilities that the function of securing safety of the occupant is impaired.

In view of the above, the applicant, in U.S. patent application Ser. No. 939,421, has proposed a webbing retractor wherein a balancer actuated by an acceleration detector is engaged with the ratchet wheel, whereby the tooth top of the lock bar is reliably engaged with the tooth top of the ratchet wheel without impinging on the tooth top of the ratchet wheel, to thereby stop the wind-out of the webbing for restraining the occupant. However, in this webbing retractor, the balancer is unstable, and there has been such possibilities that, the balancer is oscillated before being engaged with the ratchet wheel when the balancer is actuated by the acceleration detector, or the balancer moves in the axial direction of the ratchet wheel when being engaged with the ratchet wheel, so that the engagement becomes incomplete.

SUMMARY OF THE INVENTION

In view of the fact described above, one object of the present invention is to provide a webbing retractor wherein, in an emergency of the vehicle, the lock bar is not sprung back by the tooth top of the ratchet wheel and reliably engaged with the ratchet wheel to instantaneously stop the wind-out rotation of the ratchet wheel and the take-up shaft. In the seatbelt system according to the present invention, a pawl is guided in the radial direction of the ratchet wheel by an acceleration detector, and the turning force received by said pawl is imparted as the oscillating force of a working plate through a guide member or members, thereby improving the balancer and the pawl in stability during operation.

BRIEF DESCRIPTION OF THE INVENTION

DESCRIPTION OF THE PREFERRED EMBODIMENTS

Description will hereunder be given of embodiments of the present invention with reference to the drawings.

Figures 1, 2:
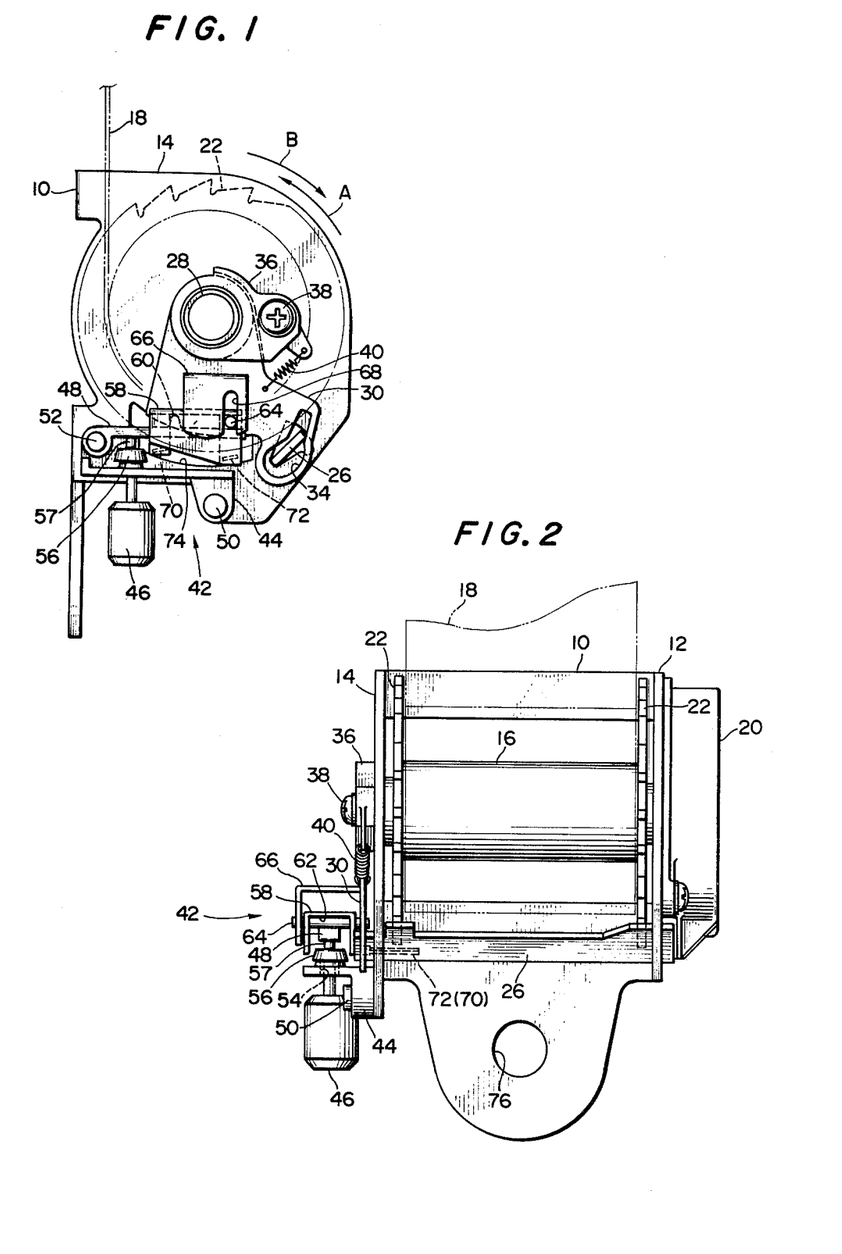
FIG. 1 is a front view showing a first embodiment of the webbing retractor according to the present invention.
FIG. 2 is a side view of FIG. 1.
Figure 3:
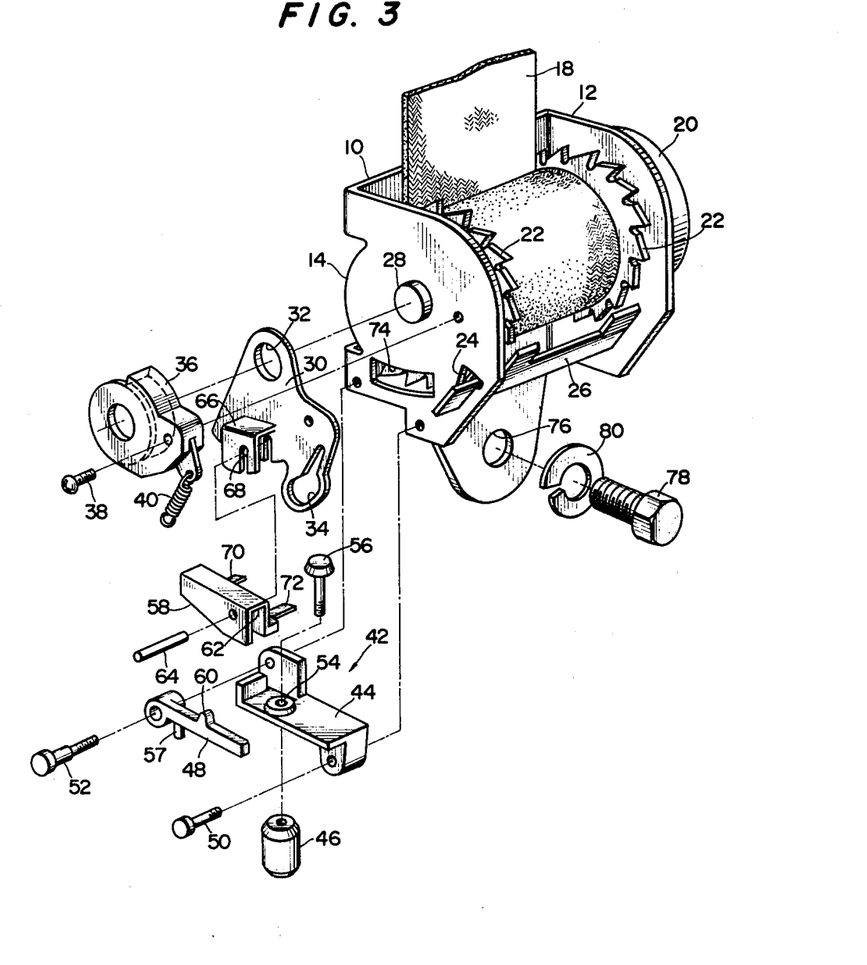
FIG. 3 is a disassembled oblique view of FIG. 1.

FIGS. 1 through 3 show the first embodiment of the present invention. A frame 10 is a thin sheet metal bent into a letter 'U' shape, and pivotally supported on legs 12, 14 connected to opposite end portions of the frame 10 and substantially in parallel with each other is a take-up shaft 16 which winds up the end portion of the webbing 18 in layers. Further, spiral spring wind-up means 20 is provided between an end portion projecting from the shaft 16 and the leg 12 so as to bias the take-up shaft 16 in the direction of wind-up rotation of the webbing 18 (the direction indicated by an arrow A in FIG. 1). With this arrangement, if the webbing 18 is pulled by the occupant against the biasing force of the spiral spring means 20, then the webbing can be wound out, rotating the take-up shaft 16 in the direction of wind-out rotation of the webbing 18 (the direction indicated by an arrow B in FIG. 1).

Furthermore, solidly secured to opposite sides of the take-up shaft 16 winding up the webbing 18 to the central portion thereof are a pair of ratchet wheels 22 adapted to rotate along with the take-up shaft 16. On the other hand, oscillatingly pivoted in cutouts 24 penetratingly provided in the legs 12, 14 of the frame 10 is a lock bar 26 being opposed to the ratchet wheel 22. The gravity of the lock bar 26 is determined such that the lock bar 26 is biased in the direction of being separated from the outer periphery of the ratchet wheel 22 by gravity. When the lock bar 26 is oscillated against the biasing force, it engages the ratchet wheel 22 to prevent the wind-out rotation of the ratchet wheel 22 and the take-up shaft 16.

A thin plate-like working plate 30 is supported by an end portion 28 of a shaft projecting from the leg 14 of the aforesaid take-up shaft 16 through a bearing hole 32 which is in the oscillating center of the working plate. Penetratingly provided at one end portion of the working plate 30 is an elongated hole 34 which is coupled onto the end portion of the lock bar 26 projecting from the leg 14. Here, the inner diameter of the elongate hole 34 is made slightly larger than the contour of the lock bar 26, so that the elongate hole 34 abuts against the lock bar 26 when the working plate 30 slightly oscillates about the take-up shaft 16.

Further, a stopper 36 is coupled onto the shaft end portion 28 of the take-up shaft onto which this working plate 30 is coupled, and solidly secured to the leg 14 of the frame 10 through a mounting screw 38 so as to function as a catch for the working plate 30, and to function as a stopper when the working plate 30 oscillates in the counterclockwise direction in FIG. 1, and tilts the lock bar 26 to a position where it does not abut against the ratchet wheel 22 in such a case that the working plate 30 abuts against the stopper 36. Here, a tension coil spring 40 is stretched between the stopper 36 and the working plate 30, by which the stopper 36 biases the working plate 30 in the counterclockwise direction in FIG. 1. When the working plate 30 rotates in the clockwise direction in FIG. 1 against the biasing force of the coil spring 40, the elongate hole 34 is adapted to oscillate the lock bar 26 so as to engage the lock bar 26 with the ratchet wheel 22.

Next, an acceleration detector 42 is installed at the lower portion of the leg 14 of the frame 10. Said acceleration detector 42 comprises a bracket 44, a pendulum 46 and a lever 48, and the bracket 44 is solidly secured to the leg 14 through a press-in pin 50 and a press-in pin 52 with a step.

Inserted through a through-hole 54 having a vertical axis and provided on said bracket 44 is a letter 'T' shaped head 56 of the pendulum 46, said head being threadably coupled into the pendulum 46, so that the pendulum 46 can detect the acceleration to oscillate. The lever 48 is pivotally supported by a large diameter portion of the press-in pin 52 with the step and whose downwardly-directed projection 57 is mounted on the head 56 so that said lever 48 is rotatable in accordance with the oscillation of the pendulum 46.

Furthermore, said lever 48 is coupled thereupon with a letter 'U' shaped balancer 58 at two points. Namely, an upwardly-directed projection 60 is provided at the intermediate portion of the lever 48, and said projection 60 abuts against the ceiling surface 62 of the balancer 58, to thereby form one fulcrum. While, a pin 64 extending through the balancer 58 is interposed between the forward end portion of the lever 48 and the ceiling surface 62, to thereby form the other fulcrum.

Further, said pin 64 is inserted into a guide groove 68 formed in a letter 'L' shaped guide member 66 which is solidly secured to the working plate 30 and clampingly holding the balancer 58 between the working plate 30 and itself. Said guide groove 68 is formed in the substantially radial direction of the ratchet wheel 22 (the direction of being engaged with or disengaged from the tooth surface of the ratchet gear). Consequently, said balancer 58 is capable of being oscillated about one of the two fulcrums, but when the lever 48 is turned, is pushed up by the lever 48 and continues to turn together with the lever 48 until an external force acts thereupon.

Furthermore, a pair of plate-shaped pawls 70, 72 are horizontally projected from said balancer 58, extend through a window 74 formed in the leg 14 and are opposed to the outer diameter of ratchet wheel 22 through a slight gap therebetween. Said pawls 70, 72 are adapted to enter the rotating path of the ratchet wheel 22 when the balancer 58 is turned together with the lever 48. While, when the lever 48 is not turned and the balancer 58 remains in horizontal position, the pawl 72 located farther from the turning center of the lever 48 is disposed at a position slightly lower than the pawl 70 (Refer to FIG. 4).

In addition, as shown in FIG. 3, a mounting hole 76 is penetrated through the lower portion of the frame 10, and the frame 10 is solidly secured to a suitable position of the vehicle by means of a mounting bolt 78 and a washer 80.

In the present embodiment with the arrangement as shown above, in oder for the occupant to put the webbing 18 on, he should pull the webbing 18 against the biasing force of the spiral spring wind-up means 20 to rotate the take-up shaft 16 in the direction of wind-out rotation (as indicated by an arrow B in FIG. 1), so that he can easily put the webbing on.

Next, in case the vehicle is fallen into an emergency such as collision after the occupant has put the webbing 18 on, the pendulum 46 detects acceleration of the vehicle to oscillate, and hence, the head 56 urges the balance 58 up through the lever 48 to the direction of the axis of the ratchet wheel 22. Since the balancer 58 receives only the urge-up force of the head 56 of the pendulum 46 at this time, the balancer 58 turns about the press-in pin 52 functioning as the center of turn of the lever 48 and is guided by the guide groove 68 to move in the radial direction of the ratchet wheel 22, whereby the pawls 70, 72 are inserted into the rotating path of the ratchet wheel 22.

Figure 5:
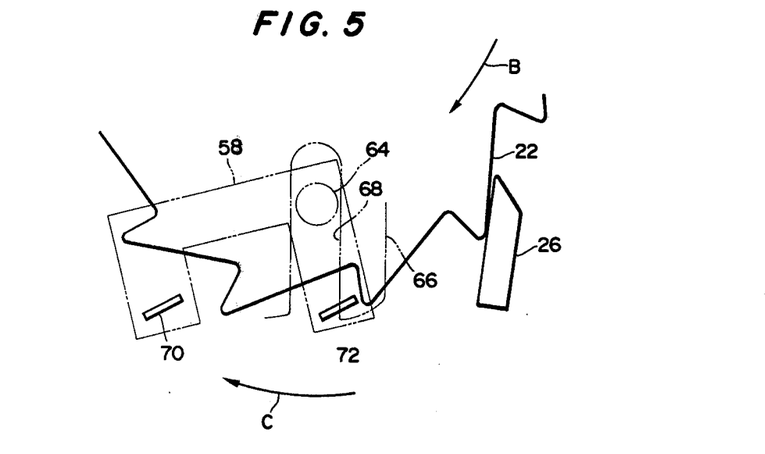
Figure 6:
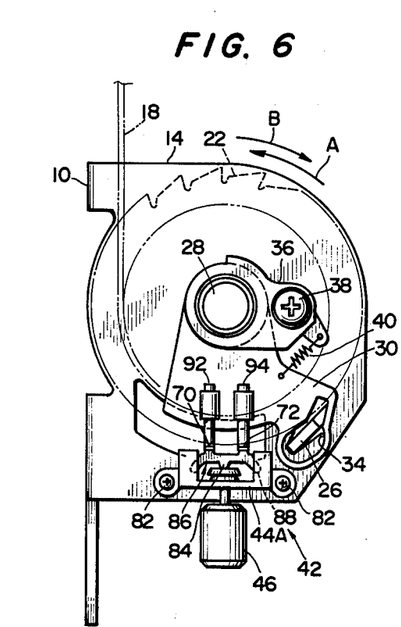
FIG. 6 is a front view showing a second embodiment of the present invention.
Figure 7:
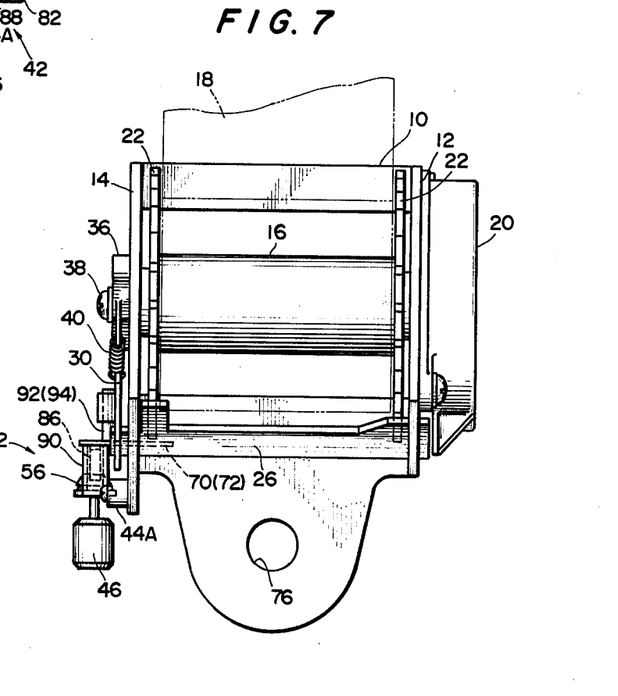
FIG. 7 is a side view of FIG. 6.
Figure 8:
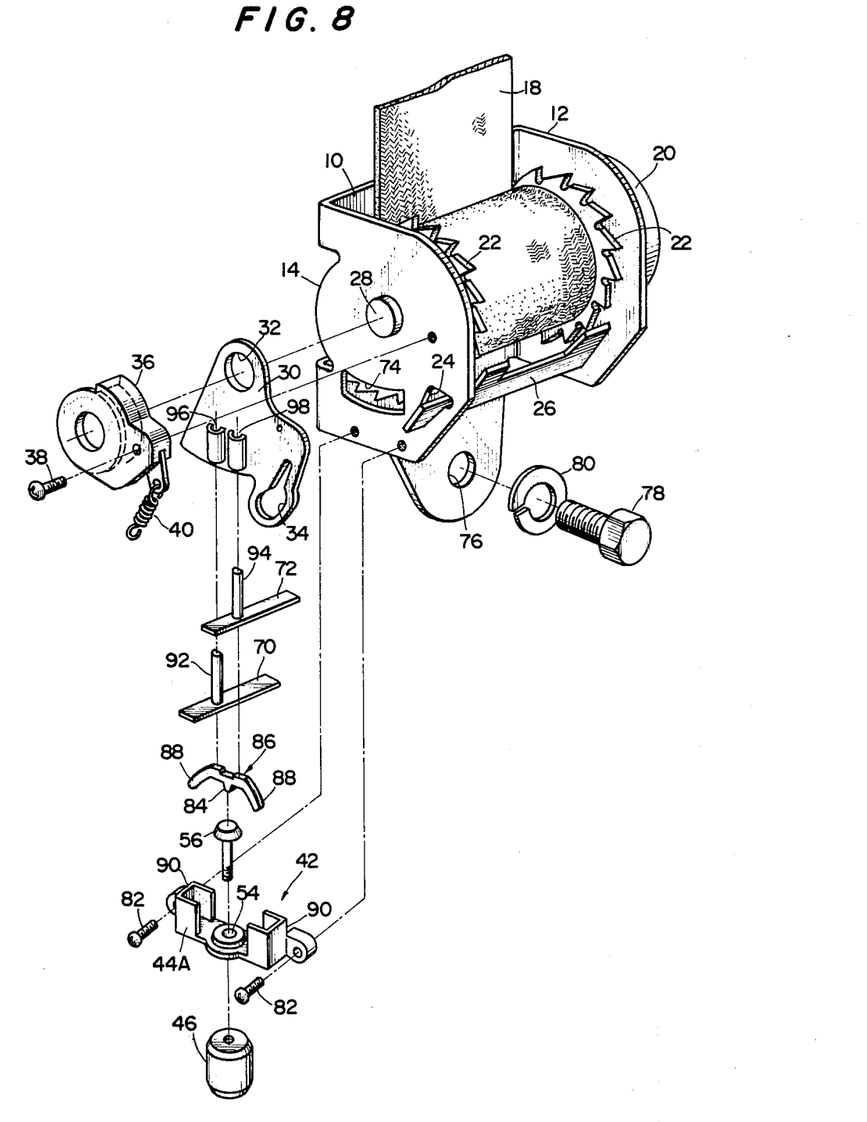
FIG. 8 is a disassembled oblique view of FIG. 6.

In such an emergency of the vehicle as described above, the occupant wearing the webbing 18 is violently thrown out in the direction of collision of the vehicle, and consequently, the ratchet wheel 22 is rotated violently in the direction of wind-out rotation of the webbing (as indicated by the arrow B in FIG. 1). For this, the plate-shaped pawls 70, 72 engaged with the ratchet wheel 22 are subjected to a force in the direction of this wind-out rotation (In FIG. 5, the plate-shaped pawl 72 receives the turning force earlier than the pawl 70.), and the force is transmitted through the guide groove 68 and the guide member 66 to rotate the working plate 30 about the take-up shaft 16. Consequently, the elongate hole 34 of the working plate 30 causes the lock bar 26 to turn in the cutout 24 to engage the ratchet wheel 22, whereby the ratchet wheel 22 and the take-up shaft 16 are sharply stopped, thereby reliably restraining the occupant wearing the webbing 18.

Study will hereunder be made on the case where the plate-shaped pawl 72 is sprung back by the tooth top of the ratchet wheel 22 at the initial stage of the engagement of the plate-shaped pawl 72 with the ratchet wheel 22 in an emergency of the vehicle as described above. Since the plate-shaped pawl 72 is guided in the substantially radial direction of the ratchet wheel 22 (upward and downward directions in FIGS. 4 and 5), the plate-shaped pawl 72 thus sprung back is sharply repulsed in the direction of separating from the ratchet wheel 22, and accordingly, the balancer 58 is subjected to a turning force about the pin 64 in the direction indicated by an arrow C in FIG. 5. Consequently, the plate-shaped pawl 70 projected from the other portion of the balancer 58 is reliably engaged with the ratchet wheel 22 by the strong turning force of the balancer 58 so as to rotate the working plate 30 about the take-up shaft 16. Hence, even if one pawl 72 out of the two is sprung back by the tooth top of the ratchet wheel, the lock bar 26 can be reliably engaged with the ratchet wheel 22.

Next, FIGS. 6 through 10 show the second embodiment of the present invention. In this embodiment, a bracket 44A of an acceleration detector 42 is installed at the lower portion of the leg 14 of the frame 10 through a mounting screw 82. Additionally, said bracket 44A is provided thereon with uprightly erected walls 90 arranged in letter 'U' shape, between which incorporated and vertically guided are oscillating opposite end portions 88 of a balancer 86 whose oscillating center 84 is mounted on the head 56 of the pendulum 46.

Additionally, a pair of plate-shaped pawls 70, 72 are mounted on the oscillating opposite end portions of the balancer 86, and end portions of said pawls 70, 72 extend through a rectangular window 74 penetrated in the leg 14 of the frame 10, and are opposed to the outer periphery of the ratchet wheel 22 through a slight gap. Furthermore, rod-like guides 92, 94 each having a semicircular cross-section are erectedly provided on the pawls 70, 72, respectively, and inserted into guide holes 96, 98 formed in one side of the working plate 30. Said guide holes 96, 98 are adapted to guide the guides 92, 94 in the vertical direction, i.e. substantially radial direction of the ratchet wheel 22, to thereby engage the pawls 70, 72 with the ratchet wheel 22 when said pawls 70, 72 are raised.

Also, with the arrangement of the second embodiment of the present invention as described above, in order for the occupant to put the webbing 18 on, he should pull the webbing 18 against the biasing force of the spiral spring wind-up means 20 to rotate the take-up shaft 16 in the direction of wind-out rotation (as indicated by the arrow B in FIG. 1), so that he can easily put the webbing 18 on.

Next, in case the vehicle is fallen into an emergency such as collision after the occupant has put the webbing 18 on, the pendulum 46 detects acceleration of the vehicle to oscillate, and hence, the head 56 urges the balancer 86 up to the direction of the axis of the ratchet wheel 22. Since the balancer 86 receives only the urge-up force of the head 56 of the pendulum 46 at this time, the oscillating opposite end portions 88 do not oscillate about the oscillating center 84, and the plate-shaped pawls 70, 72 are inserted into the rotating path of the ratchet wheel 22, said pawls being parallel with each other. Consequently, either one of the two plate-shaped pawls engage the ratchet wheel 22 (In FIG. 9, the pawl 70 engages the ratchet wheel first.), whereby the turning force of the ratchet wheel 22 is imparted to the lock bar 26 through the working plate 30, so that the lock bar 26 is engaged with the ratchet wheel.

Study will be hereunder be made on the case where the pawls 70, 72 impinge on the tooth tops of the ratchet wheel 22 at the initial stage of the engagement of the pawls 70, 72 with the ratchet wheel 22 in an emergency of the vehicle as described above. Since the plate-shaped pawl 70 is guided in the direction in the substantially radial direction of the ratchet wheel 22 in FIG. 9 (upward and downward directions in FIG. 4 and 5), the plate-shaped pawl 70 is sharply repulsed in the direction of being separated from the ratchet wheel 22, and accordingly, the balancer 86 is subjected to a turning force in the direction indicated by the arrow C in FIG. 9 to thereby turn about the oscillating center 84. Consequently, the plate-shaped pawl 72 mounted on the other oscillating portion of the balancer 86 is reliably engaged with the ratchet wheel 22 by the strong turning force of the balancer 86 so as to rotate the working plate 30 about the take-up shaft 16. Hence, even if one pawl 70 out of the two is sprung back by the tooth top of the ratchet wheel 22, the lock bar 26 can be reliably engaged with the ratchet wheel 22.

Figure 4:
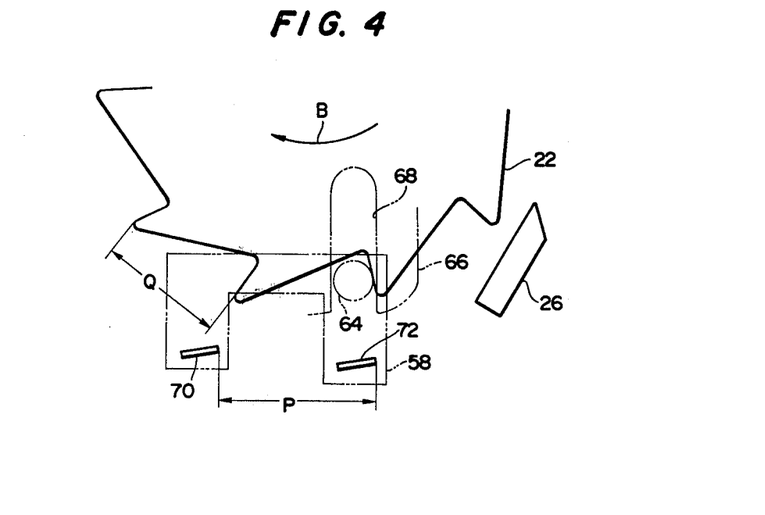
FIGS. 4 and 5 are explanatory views showing the relationship between the ratchet wheel, pawls and lock bar.
Figure 9:
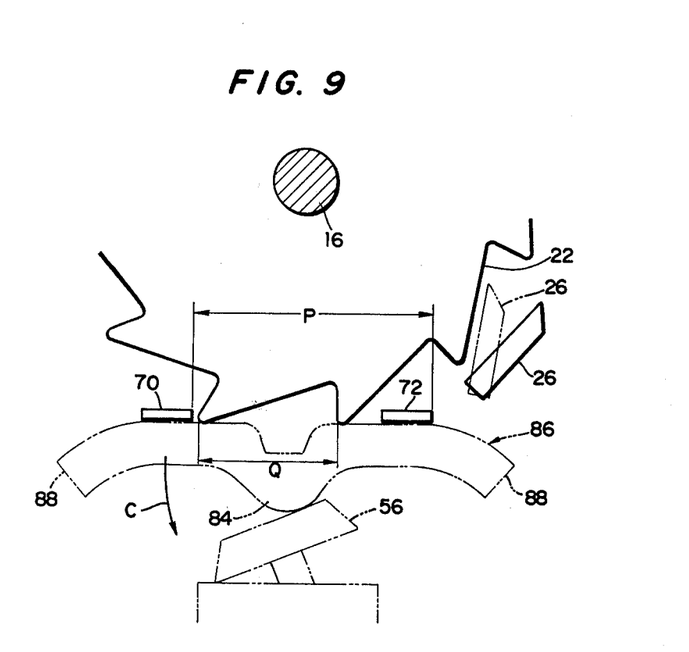
FIGS. 9 and 10 are explanatory views showing the relationship between the ratchet wheel, pawls and lock bar.
Figure 10:
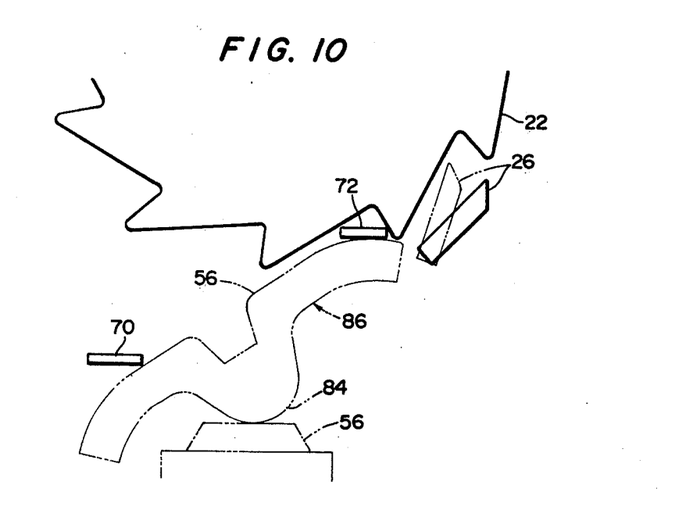

In addition, as shown in FIGS. 4 and 9, if the pitch P between the plate-shaped pawls 70, 72 and the pitch Q between the tooth tops of the ratchet wheel 22 are made different from each other, then it is possible that, even if either the pawl 70 or 72 is sprung back by the tooth top of the ratchet wheel 22, the other pawl can reliably engage the ratchet wheel 22 without impinging on the tooth top of the ratchet wheel. It may be easily arranged that the tooth top of the lock bar 26, which is oscillated at the same time as either one of the pawls 70, 72 engages the ratchet wheel 22, be inserted between the tooth tops of the ratchet wheel 22 without impinging on the tooth top of the ratchet wheel.

In the embodiments as described above, it is very easy to design the balancer 86 to have a low center of gravity so that the balancer 86 is not turned by oscillations carelessly caused. Furthermore, the plate-shaped pawls are guided by the working plate to be turned together with the lever 48 until said pawls engage the ratchet wheel, and hence, very stable when moved by the acceleration detector, do not move in the axial direction of the ratchet wheel being engaged with the ratchet wheel. Further, in the second embodiment, said pawls are housed between the erected walls arranged in the letter 'U' shape, and hence, do not fall accidentally, and can reliably operate.

Additionally, according to the present invention, the plate-shaped pawls 70, 72 do not directly lock the rachet wheel and the lock bar 26 has the force to stop the ratchet wheel, and therefore, the tooth tops of the plate-shaped pawls can be sharpened to a considerable extent as compared with the tooth top of the lock bar 26. Hence, there is little possibility that the plate-shaped pawls impinge on the tooth top of the ratchet wheel 22.

What is claimed is:

1. A seatbelt system comprising:
    a takeup shaft pivotally supported by a frame for winding up a webbing for restraining an occupant;
    a ratchet wheel solidly secured to said takeup shaft;
    a lock bar supported by said frame and engaging said ratchet wheel when oscillated, to thereby prevent the takeup shaft from being wound out;
    a working plate pivotally supported by the frame and oscillating said lock bar when oscillated;
    an acceleration detector;
    a balancer mounted on said acceleration detector and having a pair of pawls extending longitudinally in parallel to the axis of said ratchet wheel, said pair of pawls being adapted to engage said ratchet wheel in response to the detection by said acceleration detector of acceleration; and
    guide means mounted on said working plate for guiding said pair of pawls in the direction of being engaged with said ratchet wheel to thereby impart the turning force of the ratchet wheel, which is received by said pawls, to said working plate to provide an oscillating force to cause said lock bar to engage said ratchet wheel to thereby prevent said takeup shaft from being wound out.

2. A seatbelt system as set forth in claim 1, wherein said pair of pawls are each solidly secured at one end to said balancer.

3. A seatbelt system as set forth in claim 2, wherein said guide member is projected from the working plate, clampingly holds said balancer between the working plate and itself, and is provided at a portion thereof with a guide groove for guiding said balancer in the radial direction of the ratchet wheel.

4. A seatbelt system as set forth in claim 3, wherein said balancer is mounted on the acceleration detector through a lever pivotally supported by the frame.

5. A seatbelt system as set forth in claim 4, wherein said balancer is supported at two points by a projection provided at the intermediate portion of said lever and a pin extending through said balancer and mounted on the forward end portion of said lever.

6. A seatbelt system as set forth in claim 1, wherein said pair of pawls are mounted on said balancer separately of each other.

7. A seatbelt system as set forth in claim 6, wherein said guide members guide said pair of pawls separately of each other.

8. A seatbelt system as set forth in claim 7, wherein said guide members each comprises a rod-like guide solidly secured to said pawls and a guiding hole for receiving said rod-like guide and provided on said working plate.

9. A seatbelt system as set forth in claim 8, wherein said rod-like guides and guiding holes have semicircular cross-section to thereby prevent said rod-like guides from turning within said guiding holes.

10. A seatbelt system as set forth in claim 9 wherein said balancer includes oscillating opposite end portions which are incorporated and vertically guided between uprightly erected walls arranged in letter U-shape and provided on the frame.

* * * * *